(12) United States Patent
Gavie et al.

(10) Patent No.: US 6,627,239 B1
(45) Date of Patent: Sep. 30, 2003

(54) SWEET DOUGH TRAY

(75) Inventors: Shannon Gavie, Altadena, CA (US); Merrie Martin, New Milford, CT (US); Eugene Scoville, New Milford, CT (US); Robert E. Ross, Trumbull, CT (US)

(73) Assignee: Nestec S.A., Vevey (CH)

( * ) Notice: Subject to any disclaimer, the term of this patent is extended or adjusted under 35 U.S.C. 154(b) by 514 days.

(21) Appl. No.: 09/659,034

(22) Filed: Sep. 11, 2000

(51) Int. Cl.[7] ................................................ A21D 10/02
(52) U.S. Cl. .................... 426/128; 249/61; 249/119; 426/76; 426/104; 426/144; 426/389
(58) Field of Search ................. 426/104, 128, 426/132, 76, 144, 389, 496; 249/61, 119

(56) References Cited

U.S. PATENT DOCUMENTS

| | | | |
|---|---|---|---|
| 1,319,899 A | 10/1919 | Rafert | 426/76 |
| 1,929,358 A | 10/1933 | Keefer | 426/76 |
| 1,952,698 A | 3/1934 | Willem | 31/5 |
| 3,024,112 A | 3/1962 | Burgess | 426/497 |
| 3,397,064 A | 8/1968 | Matz | 99/90 |
| 3,765,909 A | 10/1973 | Moline | 99/192 R |
| 3,874,548 A | 4/1975 | Buff, Jr. | 220/21 |
| 4,120,984 A | 10/1978 | Richardson et al. | 426/412 |
| 4,215,104 A | 7/1980 | Ullman et al. | 424/15 |
| 4,517,209 A | 5/1985 | Thornton et al. | 426/383 |
| 4,522,301 A | 6/1985 | Ajmera | 206/507 |
| 4,777,057 A | 10/1988 | Sugisawa et al. | 426/412 |
| 4,812,321 A | 3/1989 | Vandervoort et al. | 426/503 |
| 4,859,473 A | 8/1989 | Arcisszewski et al. | 426/19 |
| 4,900,577 A | 2/1990 | Arciszewski et al. | 426/563 |
| 5,049,399 A | 9/1991 | Huang et al. | 426/87 |
| 5,171,599 A | 12/1992 | Weber | 426/549 |
| 5,349,759 A | 9/1994 | Anton et al. | 33/524 |
| 5,366,744 A | 11/1994 | Drummond et al. | 426/128 |
| 5,510,135 A | 4/1996 | Galder | 426/512 |
| 5,523,107 A | 6/1996 | Wallin | 426/549 |
| 5,632,924 A | 5/1997 | Gics et al. | 249/111 |
| 6,280,783 B1 | 8/2001 | Blaschke et al. | 426/144 |

FOREIGN PATENT DOCUMENTS

| | | |
|---|---|---|
| CA | 1338372 | 6/1996 |
| DE | 94 17 488 | 1/1995 |
| EP | 0 084 210 | 7/1983 |
| EP | 0 145 550 | 6/1985 |
| EP | 0 214 707 | 3/1987 |
| GB | 461263 | 3/1937 |
| GB | 679 991 A | 9/1952 |
| GB | 2314311 A | 12/1997 |
| WO | WO 90/01877 | 3/1990 |
| WO | WO 01/06858 A1 | 2/2001 |
| WO | WO 01/64528 A1 | 9/2001 |

OTHER PUBLICATIONS

Riddle, J.S., "Frookies to Offer Cookies to In–Store Departments," Supermarket News, 40(26):40 (1990).

Brochure from Ready–Bake International titled "Gourmet Cookies".

*Primary Examiner*—George C. Yeung
(74) *Attorney, Agent, or Firm*—Winston & Strawn

(57) ABSTRACT

The invention is directed to a ready-for-use frozen or refrigerated sweet dough which is prepared from flour, sugar, a leavening agent and fat, and which is provided in a form that includes grooves, score lines, or a combination thereof, to facilitate separation of the dough into pieces that can be baked into individual bakery products such as cookies, muffins, brownies, or other pastries. The invention also relates to a method for providing individually baked products comprising the steps of providing an uncooked dough sheet or block which has separable portions of predefined shape, separating one or more portions from the sheet or block and then baking the portions to obtain individually baked products. The shapes of the portions are defined by grooves, score lines or combinations thereof and the portions are separated from the sheet by breaking them along the grooves or score lines. The grooves or score lines may be intersecting or non-intersecting and substantially straight to define polygonal shaped portions, or at least partially arcuate to define the shape of an object having non-linear features, such as a cartoon character.

27 Claims, 4 Drawing Sheets

SWEET DOUGH TRAY

TECHNICAL FIELD

The invention is directed to a ready-for-use sweet dough product which includes dough disposed on and in a tray. The product can be preserved in a refrigerator or freezer. The dough disposed on the tray facilitates handling the product, breaking the dough into smaller pieces for baking into a final product such as cookies, and allows the product to be formed into a predetermined shape.

BACKGROUND

Ready made cookie doughs already exist on the market. Typically, the dough is refrigerated and packaged either in a cylindrical shape or packaged in a cup. During use, the consumer uses a spoon or a knife to form the cookie in a circular shape prior to baking. This particular cookie dough preparation requires extensive manipulation of the cookie dough prior to use. If the cookie dough is packaged in the form of a block or sheet, then a forming device is needed in order to give the cookie the desired circular form. This cookie dough manipulation, however, leaves remnants of cookie dough pieces which must then be recycled and reshaped if desired. Further, extensive manipulation of some types of dough is not desired, as it may adversely affect the texture of the baked product.

Another conventional product is a frozen cookie dough which is in the form of individual amounts to form single cookies. The amounts are provided by forming dough balls or by cutting the dough into individual pieces. The balls or pieces are then placed adjacent each other on a tray or other support, and are then frozen. The dough pieces, being tacky before freezing, stick to adjacent pieces and freeze into a solid block. During use, the consumer thaws the block and then separates the individual pieces for baking. As the preparation before freezing is somewhat complex, an improvement on these type products is also needed.

SUMMARY OF THE INVENTION

The present invention relates to a consumer-friendly, ready-to-bake sweet dough disposed in a tray so that the dough requires only a minimum amount of manipulation during use and which advantageously minimizes or eliminates dough pieces that need to be reshaped or recycled. The sweet dough is preformed by recesses in the tray into shapes to assist in the preparation and baking of the product. The tray facilitates separating the dough into ready to use uncooked dough portions of a predetermined form having a thickness and an upper and a lower surface.

This tray has a top surface and beneficially a plurality of recesses. The recesses each have at least one side for a circle or oval-like shape, or multiple sides for a polygon or other type shape. The sides have a top edge and a bottom edge. The top edge of the at least one side is attached to or continuous with the top surface of the tray. The recess also has a bottom that is attached to or continuous with the bottom edge of the at least one side.

The recess can be in the shape of a fanciful design or can have a fanciful design or decoration embossed thereon.

The side of the recess is beneficially between about 1 mm and about 25 mm in depth, preferably between about 3 and about 15 mm in depth. The embossed design, if any, is beneficially between about 1 mm and about 15 mm in depth, preferably between about 2 and about 8 mm in depth. The recess defines a volume adapted to contain a quantity of dough that, along with dough above the top of the tray, advantageously corresponds to about one serving.

The ready-for-use sweet dough is typically prepared from flour, sugar, a leavening agent, and a fat. The dough is provided in a form ready for baking having grooves, score lines, or a combination thereof which define pieces of dough that are to be broken off and baked into final products, such as cookies, brownies, muffins, a cake, quick bread, or other pastry or bakery products.

At least a portion of the dough is disposed in the recess. If the dough is not a rising dough such as is used to prepare muffins, the dough fills at least 75 percent of the recess. Preferably the dough fills 100 percent of the recess. More preferably, the dough fills 100 percent of the recess and there is excess dough in a layer above the top edge of the recess. This layer of dough can be separated along predetermined lines, where the tray is adapted to bent or to separate to facilitate removal of an individual portion. This dough extending above the top surface of the tray should have a thickness at least 10 percent of the depth of the recesses, preferably at least 30 percent of the depth of the recesses, and more preferably at least 50 percent of the depth of the recesses.

This top layer of dough advantageously includes an imprint of grooves, score lines, or combinations thereof. The imprint should substantially follow the bending areas and defines pieces of the dough to be broken off and baked. By bending the tray, the dough will tend to separate at the grooves or score lines. These grooves or score each have a width of from about 0.5% to about 100% of the thickness of the dough sheet or block and a depth of about 3% to about 95% of the thickness of the dough sheet or block, where the thickness of the dough sheet or block is measured immediately adjacent to the grooves.

BRIEF DESCRIPTION OF THE DRAWINGS

The remainder of the description is made with reference to the drawings which illustrate preferred embodiments wherein.

DETAILED DESCRIPTION OF THE INVENTION

Figure 1:
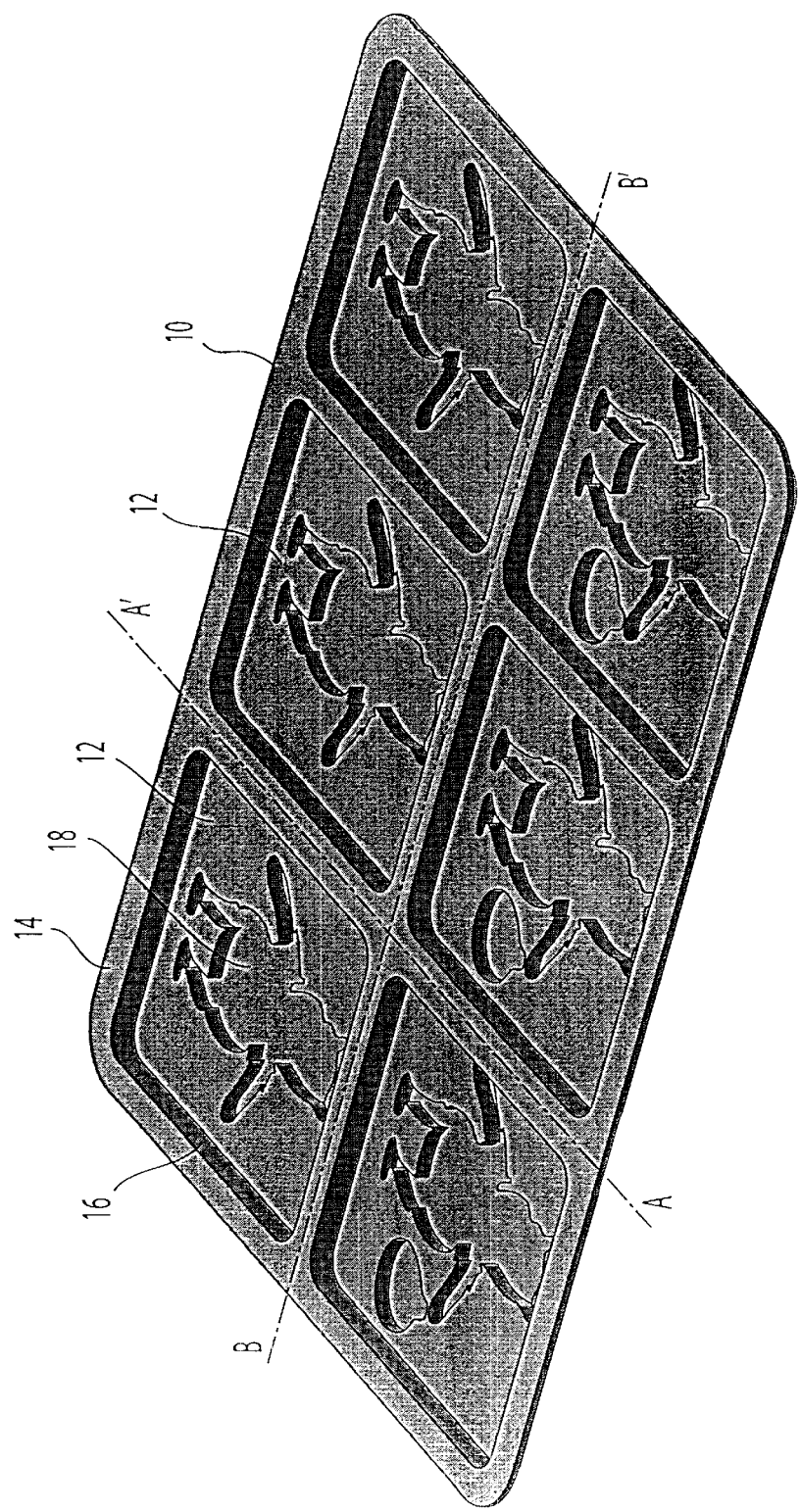
FIG. 1 is a perspective view of a tray with six recesses and including an embossed design disposed in each recess.

The present invention relates to a consumer-friendly, ready-to-bake product comprising sweet dough disposed in a tray so that the product requires only a minimum amount of manipulation during use and which advantageously minimizes or eliminates dough pieces that need to be reshaped or recycled.

The present invention relates to a new form of pre-mixed or pre-prepared bakery dough product. The term "bakery dough" is used to mean pre-mixed doughs of the types used for making bakery items where the dough is provided in the form of a sufficiently solid or semi-solid block, while the term "sweet dough" refers to a dough that contains at least 0.5% by weight of sugar. This product is typically provided under refrigerated or frozen conditions, is purchased that way by the consumer, and then is removed from the refrigerator, thawed if necessary, and then is separated into pieces which may be then placed onto a pan or into a baking tin for baking.

The sweet dough includes a number of different embodiments, one of which is exemplified by a cookie dough. It is to be understood that the invention is applicable to other products of similar sweet doughs, such as brownies, muffins, turnovers, doughnuts, cakes or other pastries. The cookie dough pieces can be baked on a flat pan in an oven, while other doughs, such as a brownie dough, a cake dough, a muffin dough or a cobbler dough, may be baked in a baking tin or in individual forms or cups. For instance, the individual forms can be made of baking paper, aluminum foil. In some preferred embodiments the individual forms can be the tray itself or a portion of the tray that contains at least one recess.

The ready-for-use sweet dough is typically prepared from flour, sugar, a leavening agent, and a fat.

Any conventional leavening agent can be utilized depending upon the final product and its desired characteristics. One common leavening agent is baking powder, and this is advantageous for preparing doughs which flow when baked. This agent at least in part contributes to the ability of the dough pieces to flow into a round bakery product, such as a cookie, during baking. As used herein, "baking powder" means a mixture of at least one bicarbonate or carbonate salt, at least one acidifying agent and at least one separating agent. These ingredients and adequate substitutes are commonly known to one of ordinary skill in the art, therefore, any known ingredient or substitute can be used with the invention. Preferably, sodium bicarbonate is used with sodium diphosphate or disodium dihydrogen pyrophosphate and a starch as separating agent. These mixtures are directly available commercially with a fixed composition.

Other conventional leavening agents can be used, including phosphates such as disodium dihydrogen pyrophosphate. These agents are typically used in an amount of about 0.1 to 3% by weight. The amount and type of leavening agent can be selected to provide the dough pieces with the ability to retain their original shape during baking so that square, triangular or other shapes can be substantially retained in the final baked product. For certain products, the leavening agent may be omitted.

Any type of flour can be used. Typically, the flour can be a cereal flour with a high or low protein content. The flour content of the sweet dough is normally from about 10% to about 60%, preferably from about 20 to about 40% and more preferably from about 27% to about 34% by weight.

The sugar that is used can be of any type. Sugars include, but are not limited to, fructose, sucrose, dextrose, corn syrup, glucose, lactose, galactose, or mixtures thereof. Preferably, sucrose is used, in the form of granulated sugar. To increase dough sweetness, a sugar substitute such as sorbitol, saccharine or any other known sugar substitute can be added either in conjunction with sugar or as a substitute for the sugar. Advantageously, sucrose helps preserve the dough during refrigeration, i.e., sucrose allows the dough to be somewhat hard, yet spread well during baking to form the desired shape.

The dough should have a moisture content from about 2 to about 25%, preferably from about 8% to about 22%, and more preferably about 12% to 16% by weight.

The type of fat has an influence on the flow capacity of the dough during baking. The fat used in the dough composition according to the invention can be a solid or liquid fat at room temperature. The fat can be of animal or plant origin, such as, lard, tallow, butter oil, butter, margarine, corn oil, copra oil, palm oil, sunflower oil, safflower oil, canola oil, soya bean oil, coconut oil, palm kernel oil, cotton oil, peanut oil, olive oil, or mixtures thereof. The fats can be emulsified or stabilized with mono- or diglycerides or other emulsifiers known in the art. For example, margarine, which already contains an emulsifier, can be used. Typically, a fat is present in an amount from about 5% to about 35%, and preferably in an amount from about 10% to about 25% by weight.

Optionally, a texturing agent can be included. One of ordinary skill in the art can determine the appropriate texturing agent with little or no experimentation. A preferred texturing agent is whole egg or egg white, liquid or dried egg powder or any egg substitute.

The sweet dough according to the invention may also contain natural or artificial flavoring agents, including but not limited to, vanilla flavor, cinnamon, ginger, cocoa powder, fruit flavor, nut flavor (e.g., peanut butter or peanut flour), and the like. These are typically used in an amount of about to 0.01% to about 8% by weight, and preferably from 0.25 to 7% by weight. Of course, various combinations of these flavoring agents are possible, as desired.

Optionally, the dough may contain inclusions. Inclusions include, but are not limited to, chocolate pieces, oat flake pieces, raisins, fruit pieces, whole nuts or nut pieces, i.e., groundnuts, hazelnuts or other nuts, caramel, or various mixtures thereof. The inclusions can be of any edible size, and are typically from about 1 mm to about 25 mm, preferably from about 4 mm to about 10 mm. The amount of inclusions is not critical and can vary from 1 to 30% by weight. Optionally, dark chocolate, milk chocolate, white chocolate, compound coatings or mixtures thereof may be used in the form of morsels, pellets or chunks. Typically, chocolate is present in an amount from about 5% to about 50%, and preferably in an amount from about 10% to about 30% by weight.

The sweet dough is preformed easily into shapes to assist in the preparation and baking of the product. This dough can be preserved in the refrigerator or freezer as a ready-for-use refrigerated or frozen sweet dough product.

The dough is disposed in and/or on a tray that facilitates separating the dough into ready to use uncooked dough portions of a predetermined form having a thickness and an upper and a lower surface.

The tray has a top surface and at least one recess, and beneficially a plurality of recesses. The tray may contain, for example, between 4 and 24 recesses, more preferably between 6 and 12 recesses. The recesses each have at least one side for a circle or oval like shape, or multiple sides for a polygon type shape. The sides have a top edge and a bottom edge. The top edge of the at least one side is attached to or continuous with the top surface of the tray. The recess also has a bottom that is attached to or continuous with the bottom edge of the at least one side. The top surface of the tray between adjacent recesses is defined as a bending line, as the tray is predisposed to bend in such an area.

In some embodiments there is an upward facing lip along the sides of the tray to help secure the dough. In some embodiments the lip may be of a height substantially equal to the height of the layer of dough above the top surface of the tray. In such cases, it is advantageous to have the lip be precut or perforated so that it will separate easily when the tray is bent.

The tray can be made of a material such as tin foil, plastic, or a paper laminate. It is preferable to use a heat-resistant tray even though the dough is intended to be separated from the tray prior to baking. The tray is advantageously made of a plastic material that withstands freezing and heating, such as one or more of polyethylene, polypropylene, or crystalline polyester. Such materials are known in the art. The tray can be made of combinations of materials, such as a laminate, or a combination of paper, plastic, and/or tin foil. The tray may contain microwave absorbers.

The tray is typically solid, though it may be thinned near the bending lines. The tray may be perforated, especially if the dough is meant to be baked while still in contact with the tray.

The tray material should be of sufficient thickness that it can be handled without breaking or inadvertently bending, but is advantageously easily bendable along the bending lines by hand. In some embodiments the tray is perforated so as to be easily separable into individual portion sizes by hand. Generally, the sides of the recesses provide structural support to the tray. The thickness of the tray is a function both of the material of construction and the design of the tray. If a plastic tray, the plastic is preferably between 25 about 0.1 mm to about 2 mm thick.

The use of a flexible material for the tray, and a tray design with a bending line, that is, a flat top surface of the tray between the recesses, allows the tray to be particularly bendable. The tray may scored, perforated, or thinned along these bending lines such that the tray is even more easily bendable and/or separable at the bending lines. The bending lines are beneficially straight and run the length and/or width of the tray. The sides of the recesses may run essentially parallel to the bending lines.

The width of the bending line, that is, the distance between recesses, is generally between about 0.1 centimeter to about 1 centimeter. Additionally, the bend lines may advantageously follow the walls of recesses, and/or have the tray weakened by thinning, perforating, or the like, to encourage bending along the bend lines. If the tray is not readily bendable, then grooves cut into the dough should be substantially through the layer of dough to facilitate separation of individual portions.

The side of the recess is beneficially between about 1 mm and about 25 mm in depth, preferably between about 3 and about 15 mm in depth.

On advantage of the tray is that the tray can impart a geometric or fanciful design to the dough portions. Beneficially the recesses form a design, or are part of a design. An embossed design, if any, is beneficially between about 1 mm and about 15 mm in depth, preferably between about 2 and about 8 mm in depth. The embossed design may extend out from the bottom of the recess or extend into the recess.

The recess can also be part of a design by extruding on to predetermined portions of the tray and or the recesses two or more types of dough. For example, dough of one color or flavor can fill the recesses of the tray, and dough of a second color or flavor can be in the layer overlaying the top of the tray.

FIG. 1 is a perspective view of a tray (10) with six recesses. More or less than six (6) recesses can be present. Bending lines are illustrated by the lines A–A' and B–B'. The tray top (14) is continuous with the sides (16) of the recesses. The bottom of the recesses (12) are continuous with the sides of the recesses (16). An embossed fanciful design (18) is included on the bottom of the recess.

Figure 2:
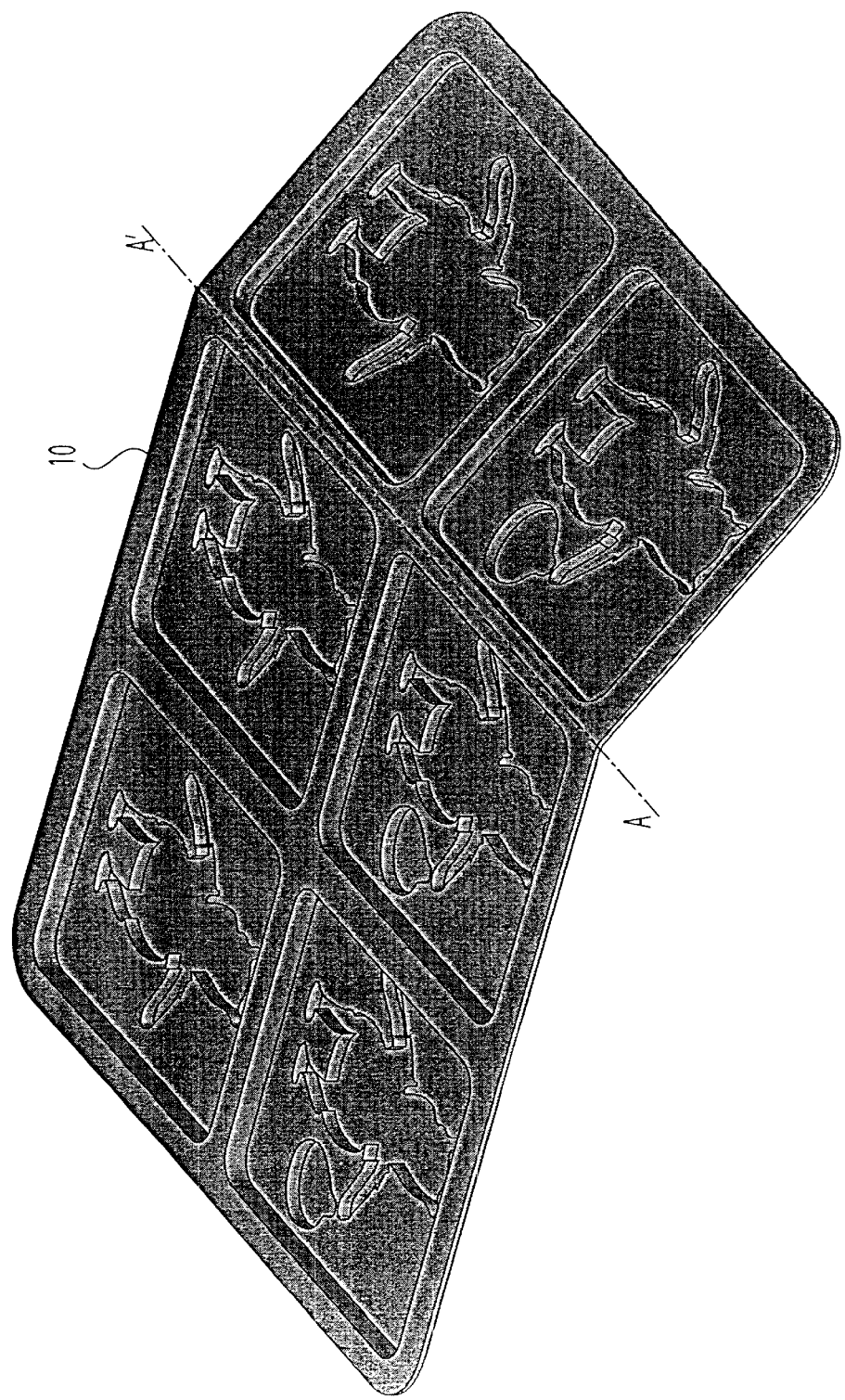
FIG. 2 is a perspective view of the tray of FIG. 1 that is bent along a bending line.

FIG. 2 is a perspective view of a tray (10) with six recesses. The tray is bent along the bending line A–A'.

Figure 3:
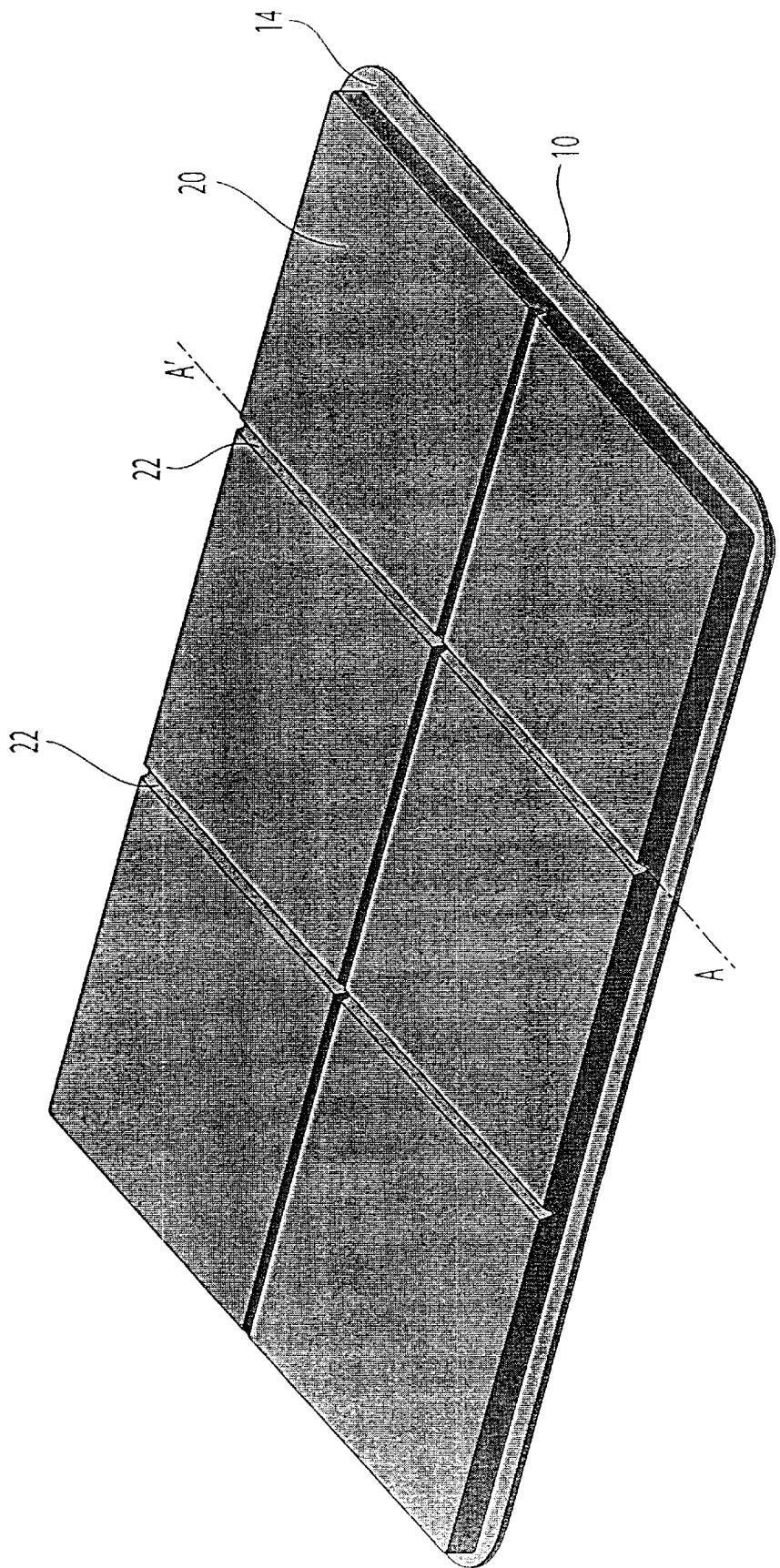
FIG. 3 is a perspective view of a ready to use dough product that has dough disposed in and above the tray of FIG. 1.

FIG. 3 is a perspective view of a product that includes a tray (10) with six recesses that are filled with dough (20). The dough extends above the top of the tray(14). Grooves (22) in the dough above the top of the tray follow generally the bending lines, i.e., line A–A'.

In one embodiment of the invention, the recesses have a generally circular or cylindrical shape, similar to a muffin pan. The recesses may form donut shapes. One preferred embodiment is a tray with 4-sided recesses where the four sides outline a parallelepiped, a square, or a rectangle. The recesses on a given tray may be the same or different shape, for example, the sides of the recesses may form a parallelepipedal, a square, a rectangle, a cylinder, a prismatic block, a polygon, or a mixture thereof.

The recess can assume different shapes with depth, for example having the recess formed in the shape of a square near the top edge but then changing abruptly or gradually into a circular shape nearer to the bottom edge of the at least one side. Or, the side can continually change into the bottom surface as in an oval or circular form. The recess can be in the shape of a fanciful design or can have a fanciful design embossed thereon. Examples of fanciful designs include a cartoon character, a dancing bear, a fish, a star, and the like.

The tray may be black or any color. The tray made optionally be made from soft plastic and/or optionally have rounded corners and/or comprise bright colors to be attractive to children for use as toys after the dough has been removed.

The surface of the tray and/or recesses may be smooth or may contain a design, such as a net or mesh made of intersecting small lines, or have a rough pebbly texture. Preferably the tray is smooth to ease separation of the dough from the tray or tray portion. The tray may be perforated or solid or a combination thereof.

At least a portion of the dough is disposed in the recess or recesses of the tray. The dough is prepared and molded using conventional devices. The dough is beneficially extruded or pressed into the tray in a manner to fill the recesses with dough, and to optionally form a layer or sheet of dough above the top of the tray. The sheet is typically prepared to be broken into predetermined sizes using recesses and bend lines, and also optionally grooves or score lines or a combination thereof, to define the shape of the individual portions to be baked. The predetermined size can be any convenient size, however, the size should be sufficiently large to provide a desired baked product. The grooves or score lines in the sheet of dough above the top of the tray are typically made using marker rolls or any other apparatus known to those skilled in the art.

The recess defines a volume adapted to contain a quantity of dough that, along with dough above the top of the tray if any, advantageously corresponds to about one serving. That is, the dough in the recess and in the space above the recess is sufficient to form about one baked product. The dough may be provided in a form ready for baking having grooves, score lines, or a combination thereof which define pieces of dough that are to be broken off and baked into final products, such as cookies, brownies, muffins, a cake, quick bread, or other pastry or bakery products.

For doughs that are not prone to extensive rising, for example normal cookie dough, the dough preferably fills at least 70 percent of the recess. More preferably the dough fills 100 percent of the recess.

In some embodiments, the dough fills 100 percent of the recess and there is excess dough in a layer or sheet above the top edge of the recess. That is, it may be advantageous to have the dough overfill the recesses, such that a layer of dough overlays the top surface of the tray.

For dough prone to extensive rising, the design may be visible after baking if the dough is baked in the sheet. A preferred dough is a dough that does not run or overly rise during baking, such that the design of the recess is readily visible in the baked product whether or not the product is baked while in contact with a portion of the tray.

According to the invention, the dough is sufficiently thick to form a cookie or other bakery product of edible size upon baking the contents between two bending lines. This feature avoids further dough manipulation either by rolling or folding the dough.

If there is a sheet of dough overlaying the top surface of the tray, this layer of dough is meant to be separated along predetermined lines prior to baking, and advantageously the tray is adapted to bent or to separate to facilitate separation along the predetermined lines. This dough sheet extending above the top surface of the tray should have a thickness of at least 10 percent of the depth of the recesses, preferably at least 30 percent of the depth of the recesses, and more preferably at least 50 percent of the depth of the recesses. This dough forms a sheet of dough disposed above the top surface of the tray. Typically, the sweet dough sheet has a thickness above the top of the tray of from about 0.1 cm to about 2 cm, and preferably from about 0.5 cm to about 1.5 cm.

The top layer of the dough sheet advantageously includes an imprint of grooves, score lines, or combinations thereof. The imprint should substantially follow the bending areas and defines pieces of the dough to be broken off and baked. These grooves or score lines each have a width of from about 0.5% to about 100% of the thickness of the dough sheet or block and a depth of about 3% to about 95% of the thickness of the dough sheet or block, where the thickness of the dough sheet or block is measured immediately adjacent to the separation lines.

Grooves or score marks in the dough beneficially follow the bending lines. By bending the tray, the dough will tend to separate at the grooves or score lines. When a product is bent along the bending line, especially if the bend is in the direction such that the dough at the bending lines is under tension, the dough will have a strong tendency to part at the scores or grooves. The block of dough with an imprint can be readily broken into smaller blocks by using a knife or by hand. When using a knife, the knife completely cuts the block of dough beyond the grooves to the top of the tray. Alternatively, the dough can be pulled apart using one's hands. There is no waste due to shaping and no manipulation, other than cutting or breaking of the dough by the consumer, prior to baking.

Advantageously, the grooves are provided in a V-like shape, a straight vertical cut which is essentially perpendicular to the cookie dough surface, or a combination of these. Other configurations, such as U-shaped, rounded or rectangular grooves, can also be used if desired. The combination of grooves and score lines is particularly useful when the block of dough is made from a soft dough. Useful score line designs are illustrated in U.S. application Ser. No. 09/453,914, filed Apr. 25, 2000. The content of which is expressly incorporated herein by reference thereto. While the score lines and grooves disclosed in that application are provided in the dough, the desired configurations can be molded in the plastic tray of this invention. Placement of a sheet of refrigerated dough onto the tray with pressure from a roller or similar device will fill the recesses of the tray with dough while simultaneously forming the score line and grooves therebetween.

Once the dough is extruded onto a tray, it travels along a belt conveyor or similar device, and marker rolls and knives can be used to form grooves as the block of dough passes beneath the rolls and knives. Longitudinal grooves or score lines can be provided by the marker rollers while lateral grooves or score lines are made by knives. The marker rollers and knives can be shaped or configured to match the type of groove or score line desired. For example, a v-shaped knife will provide a v-shaped groove. Optionally, either scores lines, grooves, or combinations thereof can be made, and one of ordinary skill in the art can configure the marker roller surfaces or knife shape to achieve the desired result.

The groove or score line depth should be sufficient to allow the consumer to either break the blocks, as is known with typical chocolate bars, or to pull the blocks apart. A knife can be used to cut along the grooves or score lines, although this is not necessary. For a dough thickness of 2 cm above the top of the tray, the depth of the grooves or score lines would typically be from about 1 mm to about 15 mm, and preferably from about 5 mm to 20 about 10 mm. When grooves are present, a width of from about 0.1 mm to about 10 mm, preferably from about 1 mm to about 4 mm is used. When score lines are present, the width would typically be from about 1 mm to about 3 mm.

As the top surface of the extruded dough slab is not perfectly smooth, the depth and width of each groove and/or score line are not identical. Also, inclusions such as chocolate chips or nuts can affect the uniformity of the dimensions of the grooves or score lines. For these reasons, the values and ratios mentioned above are considered as averages.

The grooves or score lines may be intersecting or non-intersecting and substantially straight to define polygonal shaped portions, or at least partially arcuate to define the shape of an object having non-linear features. Preferably the bending lines are substantially straight and intersect at least one other bending line. If the bending lines are not straight, it is preferred that the dough have a groove of sufficient depth that the dough will be easily breakable along the groove, for example a groove extending at least about 50 percent of the way through the dough along the bending line.

In another embodiment, the dough is a rising dough that is intended to be baked in the recess of a tray. These recesses are sized so as to leave sufficient room to enable each individual piece to rise and bake properly, and are only partially filled with uncooked dough. This method is more directed to the preparation of small cakes, e.g., muffins or cupcakes. The recess assists in forming the desired final size, configuration and shape of the bakery product, while providing the dough in a form to define the individual pieces.

The dough is cut or broken into smaller pieces prior to baking. The cut or break is advantageously along the scored lines between the recesses that constitute the top of the tray. Preferably, the block of dough is pre-scored into parallel-epipedal blocks from about 2 cm to about 12 cm in length and width, preferably from about 3 cm to about 8 cm in length and width, and with a thickness from about 1 cm to about 5 cm, preferably from about 1 cm to about 3 cm. If the recesses are shaped into a disk or cylinder, the cylinder typically has a diameter from about 2 cm to about 8 cm, preferably from about 3 cm to about 6 cm and a thickness from about 1 cm to about 5 cm, preferably from about 1 cm to about 3 cm.

The invention also relates to a ready-for-use bakery dough product in the form of a sheet or block on a tray which exhibits one or more of the following features; at least two different layers of dough, at least two different strips for each piece taken from the block, the same or a different design on the bottom of each recess, the same or a different decoration on the top of each piece, or a filling which is different from the basic dough and is the same or different in each piece.

The dough may be extruded onto or into the tray in two or more discrete sections. For example, one portion of the tray comprises square recesses and square dough products of one particular flavor or color, and a second portion of the tray may comprise triangular recesses and triangular or square dough products of a different flavor or color.

According to one embodiment of the invention, the block has at least two different layers. The number of layers is not critical, but from a practical point of view, the number of layers is typically between 2 and 6. Preferably, the number of layers is 2. These layers are more specifically of different compositions. This can be done for example by adding to the basic dough different types of flavors or colors which are accepted in the food area. For example, it is possible to have the basic dough as first layer and dough added with cocoa as the second layer, wherein the resultant cookie has both a clear face and a dark face. The way for producing this layered dough can be either by extrusion, sheeting or by other ways which are known in the art.

According to another embodiment of the invention, each piece of the dough defined by the bending areas is stamped on the top with a recognizable design or image, for example an animal or a geometric shape. In this case, a known stamping device is used for creating an indentation on the top of the pieces.

According to yet another embodiment of the invention, each piece of the block receives a decoration on the top face. This decoration can be either precisely placed or randomly put on the tops of the pieces of the block. As stated before, these decorations can also be placed on the bottom of the recesses or in the embossed deigns on the bottom of the recesses. The possible decorations are seeds, for example sesame seeds, or an icing, sugar balls, non-pariels or other decorations. The way to put the decoration on the top of the pieces can be either by a sprinkling device or by manual, robotic or mechanical means, all of which are known generally in the art.

According to another embodiment of the invention, the block of dough has a filling for each piece, which filling is different from the basic dough. This filling could be either a creamy or a liquid filling. This filling can be a sugar based confection such as caramel, chocolate, or a fruit or cream gel or viscous fluid. The filling can be also a solid filling, such as chocolate, a flavored dough or another aromatized dough. In the case of a liquid filling, it is so calculated that the filling remains inside the basic dough after cooking. The amount of the filling is not critical: it can represent from about 5 to 50% of the piece of dough. The shape of the filling is also not critical. In addition, it is possible for the dough to break during baking so that the filling can exude onto the baked dough. The way of producing a block with filling includes by coextrusion, by injection, or by placing the filling on a first dough layer and then putting a second dough layer upon the filling and first dough layer, in a manner similar to the way that ravioli is made.

According to yet another embodiment of the invention, the tray, and the overlaying dough sheet, has nested forms of different specific shapes or sizes. Thus, different shapes or sizes can be provided on the same sheet without having to recycle or reuse any part of the dough. For example, it is possible to have geometrical shapes, like triangles, squares, rectangles, animal shapes, toy or cartoon character shapes or any other shapes. Advantageously, these shapes are nested or otherwise interlaced to efficiently use as much of the dough sheet as possible. Preferably, the entire dough sheet is divided into the shapes without any waste.

Figure 4:
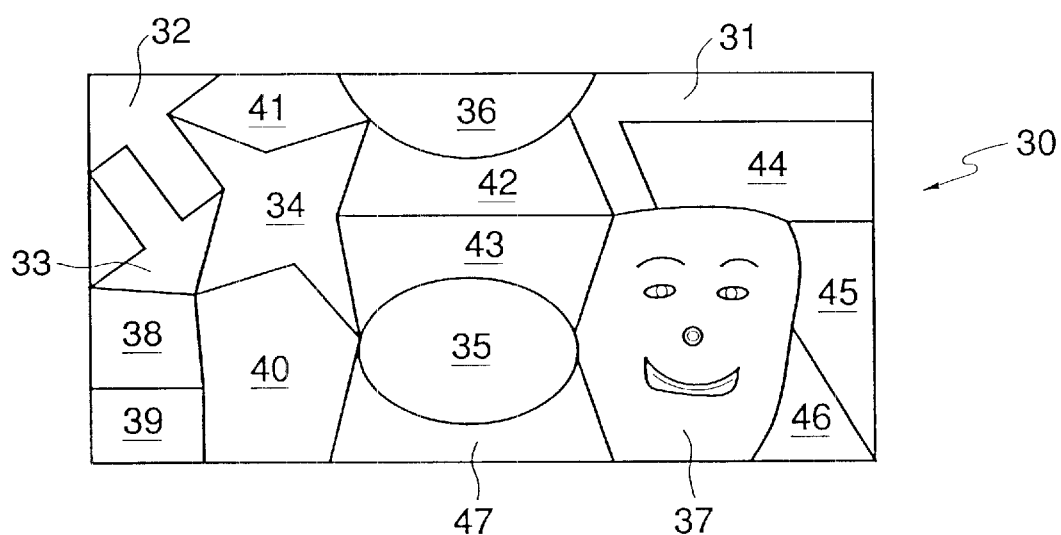
FIG. 4 is a perspective view of a dough sheet which includes a number of different shapes of figures, geometric forms, toy characters, etc., outlined by score lines.

This embodiment is illustrated in FIG. 4, wherein the dough sheet (30) includes a number of different shapes of figures, geometric forms, toy characters, etc., outlined by score lines. These shapes includes a letter (31), arrows (32), (33), a star (34), an oval (35), a half circle (36), a face (37), and other random shapes (38), (39), (40), (41), (42), (43), (44), (45), (46), (47). The underlying tray (not shown) has recesses and bending lines that substantially follow the score lines in the dough. The shapes are separated or broken off from the sheet along the score lines to form the individual portions for baking. These portions are then placed on a pan and baked as described above. The dough is formulated to retain its shape rather than to flow into a round shape during the baking process, this retaining the shape of the figure in the final baked product. The nested configuration of the shapes conserves dough and avoids wasting or resizing dough pieces e.g., those that could be left over after using a cookie cutter on a dough sheet.

The sweet dough product may be packaged in any one of a variety of ways. The block of dough on the tray can be wrapped and packaged using conventional methods. The wrapping should protect the dough from air and moisture. Typically, the wrapping is made of synthetic material or based on a cardboard or paper carton. Optionally, the dough can be frozen either prior to or after packaging. Thereafter the dough can be stored either in a refrigerator or a freezer. The shelf life of the dough in a refrigerator is typically of several months and of several months in a typical freezer.

Also, dough products can be individually wrapped, or a plurality, typically between 2 and 4 sheets, can be stacked on paper or cardboard sheets before being packaged.

The invention is also a method of manufacturing a ready-for-use sweet dough product, including providing an uncooked dough; providing a tray, where the tray comprises a top surface, a plurality of recesses, said recesses each having at least one side and a bottom defining a volume adapted to contain dough, and at least one bending area between the recesses adapted to allow the tray to bend; placing said dough into the tray so that the dough fills the recesses; and packaging the dough and tray. The dough may be placed on the tray by extruding and/or pressing onto the tray in a quantity in excess of the quantity sufficient to fill the recesses to the desired volume. If a top layer of dough is desired, dough in excess of the capacity of the recesses is extruded onto the tray, thereby forming a layer of dough on the top surface of tray, wherein the layer of the dough is between about 0.1 centimeters and about 1.5 centimeters above top surface of the tray. The method may also include imprinting grooves, score lines, or combinations thereof, where the imprint substantially follows the bending line and defines pieces of the dough to be broken off and baked. The grooves, score lines, or combinations thereof each have a width of from about 0.5% to about 100% of the distance between recesses and a depth of about 3% to about 100% of the distance between the top surface of the tray and the surface of the dough.

The tray may be pretreated prior to extrusion of the dough onto the tray. This may include coating at least a portion of the tray with an anti-sticking agent such as oil. This may include adding decorative solids, liquids including, for example, frosting, or treated doughs to the recesses before extruding the dough into the tray.

The invention also includes a method of preparing baked products. A product as described above is provided. The uncooked dough is provided in the tray, wherein the tray comprises a top surface, a plurality of recesses, said recesses each having at least one side and a bottom defining a volume adapted to contain dough, and at least one bending area between the recesses adapted to allow the tray to bend and/or separate.

The product is manipulated so that an individual serving portion is separated from the tray. A single portion is separated by breaking the dough along the bending lines or by removing the dough from at least one portion from a recess, or by separating the single portion that includes both the tray and the dough from the remaining product. Typically, the dough is separated from the remaining dough and is separated from the tray. In some embodiments, the individual portion and the portion of the tray that holds the individual portion may be separated from the remaining product. The dough has separable portions of predefined shape which are defined by grooves, scores, and/or bending areas in the tray. The method involves separating one or more portions from the sheet, advantageously by bending or breaking the tray along a bending line, and then baking the portions to obtain individually baked products. The portions are separated from the sheet by breaking the dough along the bending areas which beneficially follow the scores and/or grooves in the dough.

The tray in some embodiments is separated from the dough to be baked, and in other embodiments the dough remains in contact with the tray during baking. The portions may be baked in separate pans which define the final shape and configuration of the individually baked product, or separated portions can be baked in a single pan to facilitate more uniform baking of the portions. Alternatively, the dough may be formulated to flow upon baking and the portions baked on a sheet or pan which allows the portions to flow to form substantially round individually baked products. In some embodiments, the dough retains its shape on baking. In some embodiments, the tray itself or a predetermined portion of the tray, for example a portion of the tray comprising a recess and holding a single portion, may be used as a baking dish.

During use of the product by the consumer, individual pieces of dough can be broken off one by one, placed on a tray, and then baked in an oven. As a practical embodiment, the dough thickness may be between about 0.5 and about 2 cm, and the other dimensions between about 2 cm and about 5 cm on either side. Once the smaller blocks are separated, they are arranged on an oven tray and baked. Typically, the dough is separated from the tray prior to baking. One of ordinary skill in the art with little or no experimentation can determine the appropriate baking conditions for the type of product to be made and the oven being used. For a cookie dough, baking can be carried out using a conventional oven at a temperature from about 180° C. to about 200° C. for about 12 minutes to about 18 minutes.

What is claimed is:

1. A ready-for-use dough product comprising:
a tray comprising a top surface and a plurality of recesses, wherein the recesses each have at least one side attached to or continuous with the top surface of the tray and a bottom that is attached to or continuous with the at least one side, wherein the recess defines a volume adapted to contain dough, and at least one bending line between the recesses where the tray is-predisposed to bend; and
uncooked refrigerated or frozen sweet dough in an amount at least equal to about 70 percent of the volume of the recesses and disposed at least partially within the recesses.

2. The ready-for-use dough product of claim 1 wherein the tray has between 4 and 24 recesses, wherein each recess is adapted to support a quantity of dough sufficient to make about one serving, and wherein the dough is in an amount at least equal to about 100 percent of the volume of the recesses.

3. The ready-for-use dough product of claim 1 wherein the tray has between 6 and 12 recesses, and wherein the side or sides of the recesses are between about 1 mm and about 25 mm in depth, and the side or sides form a parallelepipedal, a square, a rectangle, a cylinder, a prismatic block, a polygon, or a mixture thereof.

4. The ready-for-use dough product of claim 1 wherein the side or sides of the recesses are between about 3 mm and about 15 mm in depth, wherein the tray comprises a plastic material that withstands freezing and withstands heating in a conventional oven, and wherein the thickness of the tray between about 0.1 mm to about 2 mm.

5. The ready-for-use dough product of claim 1 wherein the tray comprises polyethylene, polypropylene, crystalline polyester, or a mixture thereof.

6. The ready-for-use dough product of claim 1 wherein the tray comprises tin foil, plastic, or a paper laminate.

7. The ready-for-use dough product of claim 1 wherein the bending lines intersect and the width of each bending line is between about 0.1 centimeter to about 1 centimeter, and wherein the tray is thinned and/or perforated at the bending lines.

8. The ready-for-use dough product of claim 1 wherein the recess is in the form of a geometric or fanciful design.

9. The ready-for-use dough product of claim 1 further comprising at least one embossed design in the bottom of the recess, wherein the embossed design is between about 1 mm and about 15 mm in depth.

10. The ready-for-use dough product of claim 9 wherein the embossed design is between about 2 mm and about 8 mm in depth.

11. The ready-for-use dough product of claim 1 wherein the dough fills 100 percent of the recess and there is excess dough in a sheet above the top edge of the recess, wherein the dough sheet extending above the top surface of the tray has and having a thickness of at least 10 percent of the depth of the recesses.

12. The ready-for-use dough product of claim 11 wherein the dough sheet extending above the top surface of the tray has a thickness of at least 30 percent of the depth of the recesses, further comprising grooves or score lines in the dough sheet running substantially with the bending lines of the tray.

13. The ready-for-use dough product of claim 12 wherein the dough sheet extending above the top surface of the tray has a thickness of between about 0.1 cm to about 2 cm, and wherein the grooves or score lines in the dough sheet each have a width of from about 0.5% to about 100% of the distance between adjacent recesses and a depth of about 3% to about 95% of the thickness of the dough sheet above the top surface of the tray.

14. The ready-for-use dough product of claim 12 wherein the dough sheet extending above the top surface of the tray has a thickness of between about 0.5 cm to about 1.5 cm.

15. The ready-for-use dough product of claim 1 wherein at least one of the recesses comprises 4 sides outlining a parallelepiped.

16. The ready-for-use dough product of claim 1 wherein the bottom of at least one recess comprises a decoration.

17. The ready-for-use dough product of claim 1 wherein the bending area is adapted to allow separation of the tray at the bending area.

18. The ready-for-use dough product of claim 1 further comprising an anti-sticking agent, decorative solids, liquids, or a combination thereof disposed in the recesses between the tray and the dough.

19. A method of preparing a ready-for-use sweet dough product, said method comprising:
   providing an uncooked dough;
   providing a tray, wherein the tray comprises a top surface, a plurality of recesses, said recesses each having at least one side and a bottom defining a volume adapted to contain dough, and at least one bending area between the recesses adapted to allow the tray to bend;
   placing said dough into the tray so that the dough fills the recesses; and
   packaging the dough and tray.

20. The method of preparing a ready-for-use dough product of claim 19, wherein dough is placed on the tray by extruding and/or pressing onto the tray in a quantity in excess of the quantity sufficient to fill the recesses, thereby forming a layer of dough on the top surface of tray, wherein the dough has an upper surface that is between about 0.1 centimeters and about 1.5 centimeters above top surface of the tray.

21. The method of preparing a ready-for-use dough product of claim 19, further comprising imprinting grooves, score lines, or combinations thereof, which imprint substantially follows the at least one bending area and defines pieces of the dough to be broken off and baked, wherein the grooves, score lines, or combinations thereof each have a width of from about 0.5% to about 100% of the distance between recesses and a depth of about 3% to about 100% of the distance between the top surface of the tray and the second an upper surface of the dough.

22. A method for providing an individually baked product comprising the steps of
   providing an uncooked dough in a tray, wherein the tray comprises a top surface, a plurality of recesses, said recesses each having at least one sides and a bottom defining a volume adapted to contain a dough portion, and at least one bending area between the recesses adapted to allow the tray to bend and/or separate;
   removing at least one dough portion from a recess; and
   baking the removed dough portion to obtain individually baked product.

23. The method of claim 22 wherein dough is in a quantity in excess of the quantity sufficient to fill the recesses, thereby forming a layer of dough on the top surface of tray, wherein the dough has an upper surface that is between about 0.1 centimeters and about 1.5 centimeters above top surface of the tray.

24. The method of claim 22 further comprising defining the shape of the dough portions by grooves, score lines or combinations thereof and separating the portions from the sheet by breaking them along the grooves or score lines.

25. The method of claim 24 wherein the grooves or score lines are substantially straight to define polygonal shaped portions.

26. The method of claim 25 wherein the substantially straight grooves or score lines intersect to define the portions.

27. The method of claim 22 wherein a wall or a bottom of at least one recess has an embossed decoration.

* * * * *

UNITED STATES PATENT AND TRADEMARK OFFICE
CERTIFICATE OF CORRECTION

PATENT NO. : 6,627,239 B1
DATED : September 30, 2003
INVENTOR(S) : Gavie et al.

It is certified that error appears in the above-identified patent and that said Letters Patent is hereby corrected as shown below:

Column 12,
Line 39, delete "above the top edge of the recess, wherein";
Line 40, delete "the dough sheet"; and
Line 41, delete "has".

Column 14,
Line 5, change "each having at least one sides" to -- each having at least one side, --.

Signed and Sealed this

Seventeenth Day of February, 2004

JON W. DUDAS
*Acting Director of the United States Patent and Trademark Office*